Dec. 22, 1970          E. J. HEFT ET AL          3,550,124
RADAR-TELEMETRY SYSTEM
Filed Oct. 21, 1968

INVENTORS
EUGENE J. HEFT
EDWARD L. BOURQUE
BY *Richard H. Seligman*
ATTORNEY

United States Patent Office 3,550,124
Patented Dec. 22, 1970

3,550,124
RADAR-TELEMETRY SYSTEM
Eugene J. Heft, Lexington, and Edward L. Bourque, Dunstable, Mass., assignors to Sanders Associates, Inc. Nashua, N.H., a corporation of Delaware
Filed Oct. 21, 1968, Ser. No. 769,105
Int. Cl. G01s 9/10; G08c 19/26
U.S. Cl. 343—7.5                                7 Claims

ABSTRACT OF THE DISCLOSURE

Apparatus is herein disclosed for transmitting data to a remote location in conjunction with a radar system. The data to be transmitted is, employing conventional FM–FM telemetry principles, used to modulate the PRF of the radar transmitter. The composite radar signal received at the remote location is detected and filtered to provide a continuous signal which is then processed employing standard FM–FM telemetry techniques to recover the telemetry data.

BACKGROUND OF THE INVENTION

Usually, in order to transmit data from the location of a radar transmitter to another location, a separate telemetry transmitter must be provided to accomplish the telemetry function. This is wasteful since one transmitter, namely, the radar transmitter, is already available. If the need for a separate telemetry transmitter can be eliminated there is an accompany savings in weight, size, power requirements and cost. These savings are most important in applications where the telemetry information is to be transmitted from, for example, a missile or aircraft.

SUMMARY OF THE INVENTION

Accordingly, it is an object of this invention to provide a combined radar telemetry system.

It is another object of this invention to provide apparatus for transmitting telemetry information in conjunction with a radar system without employing a separate telemetry transmitter.

It is a further object of this invention to provide a minimized weight, minimized cost radar having capability to telemeter data to remote stations.

It is yet another object of this invention to provide apparatus for modulating the PRF of a radar system with telemetry information without adversely affecting performance.

Briefly, the invention comprises apparatus for modulating the radar transmitter waveform in such a manner as to transmit the telemetry information without interfering with the normal operation of the radar, and apparatus for receiving the modulated signal at a remote location. The transmitter apparatus includes means for generating a plurality of sub-carrier signals corresponding to the data on the plurality of data channels to be transmitted, means for summing said sub-carrier signals, means for altering the PRF of the radar in accordance with said summed signal and a radar transmitter. The receiver apparatus which functions to detect the modulation includes a video detector, means for passing only the detected energy at the PRF frequency, an FM detector and a plurality of subcarrier discriminators for recovering the information on each of the data channels.

BRIEF DESCRIPTION OF THE DRAWINGS

The above-mentioned and other features and objects of this invention will become more apparent by reference to the following description taken in conjunction with the accompanying drawings, in which.

DESCRIPTION OF A PREFERRED EMBODIMENT

Figure 1:
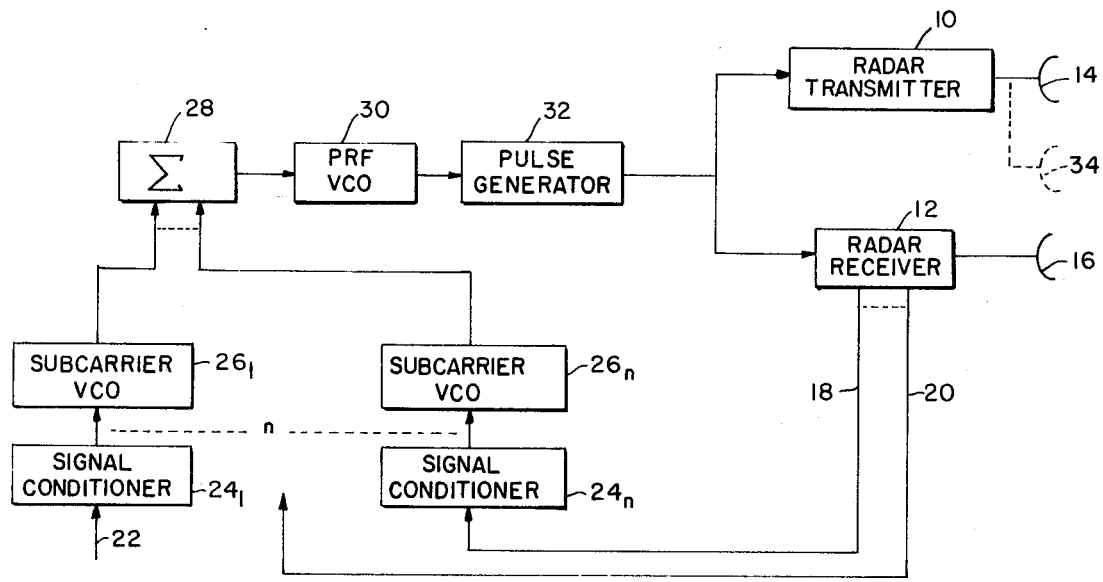
FIG. 1 is a block diagram of one embodiment of a combined radar-telemetry transmitter.

Referring now to FIG. 1, there is illustrated thereby a block diagram of a telemetry radar transmitter comprising a radar transmitter 10 and radar receiving 12 coupled, respectively, to antennas 14 and 16. Of course, as is well known to those skilled in the art, a single antenna may be employed for both the transmitting and receiving functions using appropriate coupling arrangements. Certain of the receiver outputs may comprise the telemetry information to be transmitted to a remote station such as range and doppler information. Alternatively, the telemetry information can comprise measurement data, checking, for example, the workings of the radar itself, such as various test point voltage checks. These types of data are illustrated in FIG. 1 by the output lines 18, 20 from receiver 12. Other data not related at all to the radar function may also be transmitted, such as temperature measurements, altitude measurements, etc. This type data is represented in FIG. 1 as being applied, for example, on line 22. The data to be transmitted is applied to a plurality of signal conditioners $24_1$–$24_n$ which appropriately condition the input signals for further use. The conditional signal can be a varying signal if the data parameter is varying or the signal can be a DC signal if the data parameter is constant. Signal conditioners $24_1$–$24_n$ can be, for example, amplifiers and may include filtering. The properly conditioned data signals are applied to a corresponding plurality of subcarrier VCO's (voltage controlled oscillators) $26_1$–$26_n$.

The sub-carrier's VCO's generate the modulating signals. The outputs from the sub-carrier VCO's $26_1$–$26_n$ are applied to a summer 28 which provides superposition of all the sub-carrier signals with the output from summer 28 being applied to a PRF VCO 30. The center frequency of VCO 30 is the radar PRF and the PRF is varied according to the telemetry data sub-carrier summed signal. The PRF VCO 30 signal drives a pulse generator 32 to generate the radar signal which is transmitted by radar transmitter 10 in conventional fashion.

Note, that in the event the telemetry data is to be transmitted to a remote station not in the direction which the radar is "looking," a second antenna 34 may be used, a portion of the transmitter output being coupled thereto. In some cases the sidelobe pattern of the antenna 14 is sufficiently strong to provide information in other than the direction at which antenna 14 is directed and thus a separate antenna would not be required.

Thus, the data to be telemetered is transmitted as pulse position modulation (PPM) of the radar signal, or equivalently, as frequency modulation (FM) of the pulse repetition frequency (PRF) of the radar, For purposes of understanding the system, it may be considered that the PRF is the information carrier and standard FM telemetry techniques can be used to modulate this carrier.

Deviation of the PRF about its nominal value does not impair the radar performance; in fact, some existing radars performance; in fact, some existing radars employ PRF deviation (i.e., PRF jitter) to achieve improved radar characteristics. If the PRF modulation frequencies are constrained to a portion of the frequency spectrum not used for the radar function, the radar receiver does not respond to this modulation. Thus, information is added to the radar transmission and the radar performance is unaffected.

As an example, consider a pulse doppler radar operating with a PRF of 5 mHz. and a maximum doppler frequency of 20 kHz. A PRF deviation of ±150 kHz. has negligible effect on the radar function and modulation frequencies greater than 20 kHz. do not affect the radar receiver performance. The frequency band above 20 kHz. can be used to carry information in the same manner as the standard FM or FM–FM telemetry channels.

Summarily, in the combined radar-telemetry system of FIG. 1 the radar transmitter and receiver are ordinary units with the transmitted pulse and receiver range gates derived from the output of pulse generator 32. The pulse generator is driven by VCO 30, so this oscillator frequency determines the PRF of the radar. The VCO operates such that its frequency of oscillation is a monotonic function of its input voltage. Thus the radar PRF can be varied by changing the voltage level into the VCO. The drive signal for the PRF VCO is obtained by summing the outputs of a number of sub-carrier VCO's $26_1$–$26_n$. This is the standard FM–FM telemetry technique which allows the basic modulating frequency band to be divided into a number of separate information channels. Enough channels may be included to accommodate all of the radar receiver output data as well as any additional data which is desired.

Figure 2:
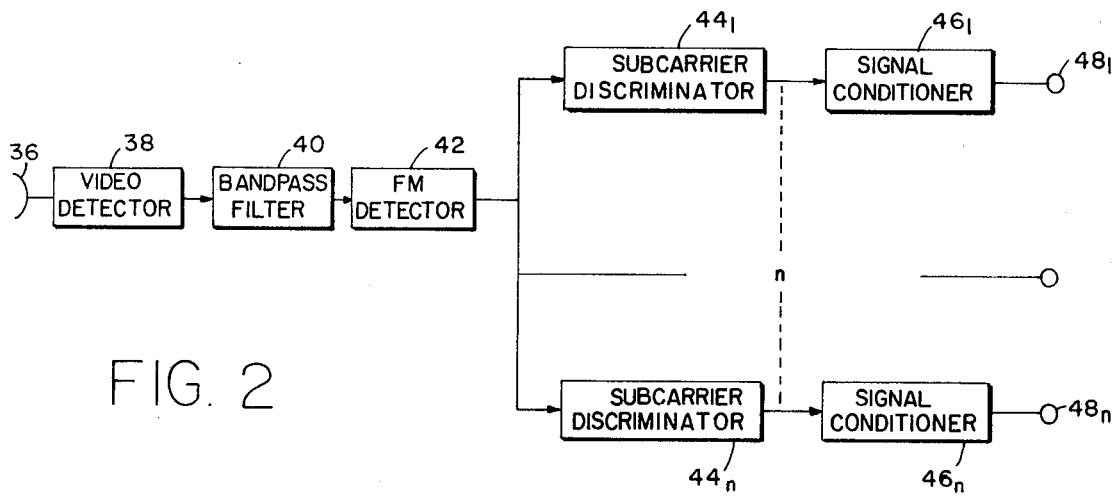
FIG. 2 is a block diagram of one embodiment of a telemetry receiver.

Referring now to FIG. 2, there is illustrated thereby one embodiment of a telemetry receiver for receiving and processing the signals emanating from the system of FIG. 1. The receiver includes an antenna 36 coupled to a video detector 38. Alternatively, an IF system, well known to those skilled in the art, could be substituted therefor. The output from video detector 38 is applied to a bandpass filter 40 which passes energy only at the PRF frequency. This changes the pulse train emanating from the video detector into a continuous signal the frequency of which is changing according to the data modulation. The output from bandpass filter 40 is applied to an FM detector or discriminator 42. The output from FM detector 42 should be a similar signal to that of the output from summer 28 of FIG. 1. The signal from FM detector 42 is fed to a plurality of sub-carrier discriminator $44_1$–$44_n$, the outputs from which are similar to the inputs to the sub-carrier VCO's of FIG. 1. A plurality of signal conditioners $46_1$–$46_n$ condition the signals for further use with the outputs derived at terminals $48_1$–$48_n$.

Summarily, the signal received from the radar is detected in an amplitude detector. The output of this detector is a video pulse train corresponding to the output of the pulse generator which drives the radar. The pulse signal is fed to a bandpass filter centered at the radar PRF and the output of the filter is the frequency modulated CW signal. Standard FM receiver techniques are then used to detect the modulation and separate the information signals into the various output channels.

We claim:
1. In a system for transmitting data in conjunction with a radar, apparatus, including:
   a pulse radar transmitting system having a means for generating a pulse train;
   at least first and second data sources;
   means coupled to said first data source for generating a first sub-carrier signal corresponding to a data signal from said first data source;
   means coupled to said second data source for generating a second sub-carrier signal corresponding to a data signal from said second data source;
   means for summing said sub-carrier signals; and
   means for changing the PRF (pulse repetition frequency) of the pulse train in accordance with said summed signal.

2. In the system of claim 1, said means for generating a pulse train including a pulse generator and a variable oscillator.

3. In the system of claim 2, said variable oscillator being a voltage controlled oscillator.

4. In the system of claim 3, said means for changing the PRF of said pulse train including means for applying said summed sub-carrier signals to said voltage controlled oscillator.

5. A radar-telemetry system, comprising:
   a radar transmitter;
   a plurality of data sources;
   a plurality of sub-carrier voltage controlled oscillators coupled to said data sources;
   means for summing the outputs from said sub-carrier voltage controlled oscillators;
   a PRF voltage controlled oscillator coupled to said summing means;
   a pulse generator coupled to said PRF voltage controlled oscillator, the output therefrom being coupled to said radar transmitter; and
   a telemetery receiver.

6. A radar-telemetry system as defined in claim 5 wherein said telemetry receiver includes:
   a video detector;
   a bandpass filter coupled to said video detector;
   an FM detector coupled to said bandpass filter; and
   a plurality of sub-carrier discriminators coupled to said FM detector.

7. A telemetry receiver for recovering data which is impressed on a pulse radar signal as a frequency modulation of the PRF thereof, comprising:
   means for detecting the radar signal;
   means for generating a single signal in accordance with the changing PRF frequency;
   an FM detector coupled to said generating means; and
   a plurality of sub-carrier discriminators coupled to said FM detector for separating individual data elements.

References Cited

UNITED STATES PATENTS

| | | | |
|---|---|---|---|
| 2,709,773 | 5/1955 | Getting et al. | 343—7(RS) |
| 3,210,747 | 10/1965 | Clynes | 340—206 |
| 3,289,204 | 11/1966 | Murray et al. | 343—7.6UX |

R. D. BENNETT, JR., Primary Examiner

T. H. TUBBESING, Assistant Examiner

U.S. Cl. X.R.

343—7.6; 340—206, 207